ated Oct. 14, 1958

United States Patent Office 2,856,370
Patented Oct. 14, 1958

2,856,370

PROCESS FOR POLYMERIZING CYCLIC ETHERS WITH PHOSPHOROUS PENTAFLUORIDE

Earl L. Muetterties, Hockessin, Del., assignor to E. I. du Pont de Nemours and Company, Wilmington, Del., a corporation of Delaware No Drawing. Application September 9, 1953
Serial No. 379,297

7 Claims. (Cl. 260—2)

This invention relates to polymerization, and, more particularly, to a new process for effecting the polymerization of heterocyclic organic compounds.

In the polymerization or organic compounds, it has been customary to employ a catalyst to initiate the polymerization reaction. By varying the concentration of the catalyst, it has been possible to control the time required for polymerization so that suitable provision can be made for removing the heat of reaction, as well as to control the physical properties of the polymer by varying the degree of polymerization, amount of crosslinking, etc. It is only natural as the science of polymerization has developed, that the variety of chemical materials which have been found to function as polymerization catalysts has been extensively multiplied. However, as those skilled in this art know, among the known catalysts for the many types of polymerization, there is great variation in the efficiency of the catalyst as well as in the desirability or undesirability of the by-products that form and in the problems related to the removal of such by-products if necessary. These variations are frequently related, in that the more efficient catalyst may be required in smaller proportion which will per se reduce the problems associated with the by-products. In this growing field there appears from time to time a catalyst which is found capable not only of initiating the polymerization of compounds known to be polymerizable by other catalysts but also of catalyzing the polymerization of a specific class of monomers so effectively that it will lead to the formation of greatly improved polymers which are not merely operable but are well adapted to uses for which the inferior polymers obtained with other catalysts are not even operable. It is with such a catalyst that the present invention is concerned.

Several types of catalysts have been used for the polymerization of cyclic ethers free from non-aromatic carbon-carbon unsaturation. In the polymerization of tetrahydrofuran, for example, inorganic acidic materials such as the Friedel and Crafts type catalysts have been employed either alone or in the form of molecular complexes with organic compounds. The art contains numerous references to tetrahydrofuran polymers prepared with these catalysts. The products for the most part were oily liquids. In the few instances where solid polymers were obtained from tetrahydrofuran, the authors were careful to point out that the products softened below 60° C. and had no practical utility as finishes, molded objects, and the like.

This invention has as an object a new polymerization process. A further object includes new polymerization catalysts, i. e., initiators. Other objects will appear hereinafter.

These objects are accomplished by the present invention wherein a cyclic ether free from non-aromatic carbon-carbon unsaturation is polymerized by bringing the same in contact with phosphorus pentafluoride either as such or in the form of preformed complex thereof with a cyclic ether. The resulting polymers are thermoplastic, have number average molecular weights above 50,000, have inherent viscosities (0.1% in benzene at 25° C.) in excess of 2.0 and become tacky and are moldable only at temperatures substantially above 100° C.

It is thought that polymer formation occurs through ring opening of the cyclic ether and that the resulting polymers are substantially linear.

In a preferred embodiment of this invention, gaseous phosphorus pentafluoride is dissolved directly in the monomer to be polymerized. This may be carried out in a vessel, protected against the ingress of moisture, with monomers which are liquid at the temperature selected for polymerization. With gaseous monomers, the phosphorus pentafluoride is pressured into a closed vessel containing the monomer. In either case polymerization starts spontaneously soon after mixing is effected and thereafter provision is made to remove the heat of polymerization. Alternatively the phosphorus pentafluoride may be first brought in contact with a molar equivalent of the cyclic ether to permit the formation of the $PF_5$/cyclic ether coordination complex. This complex is then used to catalyze polymerization of the remainder of the cyclic ether. While the phosphorus pentafluoride may be used as a catalyst in the form of a complex other than that with the cyclic ether being polymerized, little advantage is ordinarily attained by this complication.

Phosphorus pentafluoride for use in this invention may be prepared according to the copending application of E. L. Muetterties, Ser. No. 334,967, filed February 3, 1953.

The following examples in which parts are by weight are illustrative of the invention.

*Example 1*

Tetrahydrofuran is purified by refluxing over solid sodium hydroxide, distilling under nitrogen, refluxing over lithium aluminum hydride and distilling therefrom immediately prior to use. To 3550 parts of this purified tetrahydrofuran is added, under nitrogen, 10 parts of freshly prepared and purified solid phosphorus pentafluoride/tetrahydrofuran coordination complex (prepared by saturating tetrahydrofuran with phosphorus pentafluoride at 0° C. and subliming the resulting solid at 70° C./0.02 mm. pressure to effect purification). The mixture of tetrahydrofuran and catalyst is maintained at 30° C. for six hours to effect polymerization. The resulting solid, colorless polymer is heated in water to destroy any residues of phosphorus pentafluoride and is then dissolved in tetrahydrofuran. The polymer is recovered by pouring the tetrahydrofuran solution into water with violent agitation. The resulting solid, white, shredded polymer is air dried. Its weight represents a 59% conversion of the tetrahydrofuran to polymer.

To illustrate the markedly higher softening characteristics, viscosity and molecular weight of this polymer over the "solid" polymers of tetrahydrofuran prepared with the catalysts known in the art, it is compared with a polymer of tetrahydrofuran prepared with antimony pentachloride according to Example 7 of German patent application J64,911 as follows:

Seventy-two parts of tetrahydrofuran (freshly purified as in the previous experiment) is cooled in Dry Ice. Under an atmosphere of nitrogen 2.99 parts of freshly distilled antimony pentachloride is added. The reaction mixture is stored at 25° C. After 40 minutes it has set to a solid. After 24 hours the polymer is recovered by dissolving it in tetrahydrofuran, precipitating it in water, and steaming the resulting slurry to destroy the catalyst. The polymer is redissolved in tetrahydrofuran, and the polymer is precipitated by pouring the solution into ice water with violent agitation. The solid, shredded product is air dried. Its weight represents a 50% conversion of the tetrahydrofuran to polymer.

The two polymers are compared as follows:

|  | Tetrahydrofuran polymer prepared with— | |
|---|---|---|
|  | Phosphorus Pentafluoride Catalyst | Antimony Pentachloride Catalyst |
| Inherent viscosity (0.1% in benzene at 25° C.). | 3.60 | 0.63. |
| Number average molecular weight (determined osmotically, in benzene at 25° C.). | 329,000 | 22, 200.[1] |
| Temp. at which polymer sticks to brass block. | 200° C | 40° C. |
| Observations on films obtained by free molding of 0.5 g. of polymer between polytetrafluoroethylene-coated steel plates for 1 minute under 1,500 lbs./sq. in.: | | |
| Molded at 100° C | 0.016" thick,[2] 50. mm. diameter. | 0.004" thick,[3] 130. mm. diameter. |
| Molded at 230° C | 0.007" thick,[4] 72. mm. diameter. | |

[1] This value is actually somewhat high since a substantial amount of low molecular weight polymer is observed to diffuse through the membrane during the determination.
[2] These polymer particles are somewhat forced together at this temperature but are not truly fused, as evidenced by the rough edge of the "film."
[3] Tacky film. Slowly crystallized on standing. Orientable when crystallized.
[4] Non-tacky, orientable film; dry surface and excellent toughness immediately after molding.

Example II

To 100 parts of tetrahydrofuran, purified in the manner described in Example I, is added 5 parts of phosphorus pentafluoride at room temperature. Twenty minutes after the addition of the fluoride, the ether is quite viscous, and after 45 minutes, the ether is polymerized to a solid. Four hours later, the polymer is dissolved in diethyl ether, and the catalyst decomposition and polymer purification is effected in a manner identical to that described in Example I. The polymer is a pale yellow solid. The inherent viscosity of a 0.1% solution of this polymer in benzene is 2.32.

Example III

One hundred twenty-six parts of phosphorus pentafluoride is added to 300 parts of 1,3-dioxolane at room temperature. There is a heat of reaction and a two-phase liquid system rapidly appears. After twenty-four hours, the dioxolane is polymerized to a white solid.

Example IV

One hundred twenty-six parts of phosphorus pentafluoride are added to 500 parts of epichlorohydrin at room temperature. The heat of polymerization is very large, and in 20 minutes, the ether is a thick viscous oil. After 24 hours, the ether is polymerized to a solid.

Example V

One hundred parts of propylene oxide is cooled to 0° C., and 25 parts of phosphorus pentafluoride is added. There is a slight heat of polymerization and a noticeable increase in viscosity. After 48 hours, the ether is polymerized to a yellow, viscous oil.

Example VI

To four hundred parts of ethylene oxide cooled to 0° C., is added 126 parts of phosphorus pentafluoride. There is no reaction for several minutes, then after ten minutes, an almost explosive polymerization takes place. The cyclic ether polymerizes to a highly viscous oil.

Example VII

The following samples are made up:
(1) 200 parts of tetrahydrofuran and 200 parts of proylene oxide.
(2) 200 parts of terahydrofuran and 200 parts of ethylene oxide.
(3) 200 parts of 2-methyl tetrahydrofuran and 200 parts of ethylene oxide.

To each of these three samples is added 126 parts of phosphorus pentafluoride at room temperature. After one hour, mixture number one polymerizes to a solid that barely flows at room temperature. Mixture number two behaves similarly but polymerizes at about twice the rate observed in number one. Mixture number three polymerizes almost explosively and is a viscous oil in five minutes.

Example VIII

To 500 parts of octahydroisobenzofuran (distilled from lithium aluminum hydride immediately prior to use) maintained at liquid nitrogen temperature under high vacuum, is added 14.6 parts of phosphorus pentafluoride. The mixture is warmed to 30° C., and the vacuum is replaced by nitrogen at atmospheric pressure. After 18 hours at 30° C., the product is extremely viscous. It is dissolved in tetrahydrofuran, added to water and steamed to destroy catalyst. The product is again dissolved in tetrahydrofuran and precipitated in water with violent agitation. The resultant white solid after drying under vacuum at 40° C. weighs 190 parts. This polymer has an inherent viscosity in benzene at 0.1% concentration and 25° C. of 0.62. It melts on the block at 85° C.

As is evident from the foregoing examples, phosphorus pentafluoride is a versatile catalyst for the polymerization of cyclic ethers free from non-aromatic carbon to carbon unsaturation, e. g., tetrahydrofuran, 1,3-dioxolan, epichlorohydrin, propylene oxide, ethylene oxide, trimethylene oxide, tetramethylethylene oxide, glycidol, epicyanohydrin, cyclohexene oxide, 1,4-epoxycyclohexane, octahydroisobenzofuran, and the like.

Phosphorus pentafluoride is particularly advantageous as a catalyst for the polymerization of tetrahydrofuran, since it yields a polymer entirely different from those known in the art. The voluminous art on the polymerization of tetrahydrofuran shows catalysts which yield primarily liquid products of low molecular weight. A few catalysts have been shown to yield tetrahydrofuran polymers which are solid, even orientable, at room temperature. However, all the known solid polymers of tetrahydrofuran melt below 60° C. and for this reason have been described as having no utility as molded objects or in coating compositions.

With phosphorus pentafluoride catalyst according to the present invention, tetrahydrofuran is polymerized to solid polymers which have number average molecular weights in excess of 50,000, have inherent viscosities (0.1% in benzene at 25° C.) in excess of 2.0 and become tacky and are moldable only at temperatures substantially in excess of 100° C. Films of these polymers laid down as coating compositions from solutions in hydrocarbon solvents have excellent adhesion, toughness, and durability. The polymers therefore can be used for the manufacture of films and fibers thereof, molded articles where the polymer may be molded alone or with fillers, dyes, reenforcing agents, e. g., glass or asbestos fibers, etc., and in coating compositions where they may be used clear or pigmented on wood, metal, etc.

The amounts of phosphorus pentafluoride employed to catalyze the polymerization of cyclic ethers may be varied within wide limits. Amounts of phosphorus pentafluoride varying from 0.01% to 45% of the weight of the cyclic ether to be polymerized may be used. For practical reasons, it is preferred to employ from about 0.1% to about 10.0% of phosphorus pentafluoride based on the weight of the cyclic ether.

The polymerization of cyclic ethers using phosphorus pentafluoride catalyst may be carried out over a wide range of temperature. It is generally preferred to conduct the polymerization in the range between 0° C. and the reflux temperature of the ether being polymerized.

Aromatic and aliphatic hydrocarbons may be employed as solvents and diluents for carrying out the polymerization of cyclic ethers with phosphorus pentafluoride catalyst. The use of a solvent or diluent has the advantage of permitting control over the reaction temperature by providing for dissipation of the heat of polymerization. However, for maximum conversion of the cyclic ether to polymer, bulk polymerization in the absence of solvents or diluents is preferred.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of tetrahydrofuran polymers which comprises polymerizing tetrahydrofuran in the presence of from 0.01 to 45% by weight of phosphorus pentafluoride polymerization initiator based on the weight of the cyclic ether.

2. A process for the preparation of polymers from cyclic ethers free from non-aromatic carbon-to-carbon unsaturation comprising polymerizing such ethers in the presence of from 0.01 to 45% by weight of phosphorus pentafluoride polymerization initiator based on the weight of the cyclic ether.

3. Process of claim 1 wherein the phosphorus pentafluoride is brought as such into contact with the tetrahydrofuran to be polymerized.

4. Process of claim 1 wherein the phosphorus pentafluoride is brought, in the form of a preformed phosphorus pentafluoride/tetrahydrofuran complex, into contact with the tetrahydrofuran to be polymerized.

5. Process of claim 2, wherein the phosphorus pentafluoride is in the form of a complex with the cyclic ether.

6. Process of claim 2 wherein the cyclic ether is an epoxyalkane.

7. Process of claim 2 wherein the cyclic ether is an oxacycloalkane.

References Cited in the file of this patent

FOREIGN PATENTS

| | | |
|---|---|---|
| 401,297 | Great Britain | Nov. 3, 1933 |
| 558,106 | Great Britain | Dec. 21, 1943 |
| 898,269 | France | July 3, 1944 |
| 666,812 | Great Britain | Feb. 20, 1952 |

OTHER REFERENCES

Office of Technical Services, Bibliography of Scientific and Industrial Reports, vol. 1, No. 1, Jan. 11, 1946, p. 41, Abstract of P. B. No. 717, copy in O. T. S.

Hamann: Angew. Chem., vol. 63, 1951, pp. 231, 236, 237. (Copy in Scientific Library.)

U. S. Government Technical Oil Mission Report, Microfilm Reel 209, pages (frames) 80060–80061. (Copy in Library of Congress.)

U. S. Publication Board, Report 717, pages 18 and 19, January 1946.